United States Patent Office 3,117,830
Patented Jan. 14, 1964

3,117,830
DYEINGS AND PRINTS ON STRUCTURES OF TRIACETYL CELLULOSE
Guenter Lange and Julius Eisele, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany
No Drawing. Filed June 24, 1957, Ser. No. 667,680
Claims priority, application Germany June 26, 1956
4 Claims. (Cl. 8—50)

This invention relates to dyeings and prints obtained with monazo dyestuffs on structures of triacetyl cellulose and especially with para-aminomonoazo dyestuffs free from sulfonic acid and carboxylic groups.

We have found that dyeings and prints of very good fastness are obtained on structures such as fibres, flocks, yarns, woven and knit fabrics and foils of triacetyl cellulose by using as dyestuffs para-aminoazo dyestuffs free from sulfonic acid and carboxylic groups in which at least one hydrogen atom of the terminal amino group is replaced by a radical of the general formula $$-Alk-O-\underset{\underset{O}{\|}}{C}-R$$

in which Alk represents a low molecular weight, saturated alkylene group and R represents a member of the group consisting of a hydrogen atom and a low molecular weight aliphatic radical.

The dyestuffs may also be substituted in their aromatic ring system by substantially neutral substituents as halogen atoms, nitro, oxyalkyl, alkoxy, lower hydrocarbon, cyano, acyl amino, carbon amido, sulfonamido and sulfone groups.

Such dyestuffs can be prepared in a simple manner by esterification of the corresponding unesterified para-aminoazo dyestuffs containing hydroxyl groups, some of which are described for example in the U.S. patent specification No. 1,805,919, with acids such as formic, acetic, propionic or isobutyric acid.

Dyeing with these dyestuffs is carried out in known manner; dispersing agents may be co-employed.

Dyestuffs of the said kind have already been proposed for dyeing acetyl cellulose, for example in the U.S. patent specification No. 2,045,324. The expression "acetate silk" used therein refers to that esterification product of acetyl cellulose, long known and prepared industrially in large amounts, which contains on an average about 2½ acetyl groups to one glucose radical. Contrasted with this, triacetyl cellulose in which on an average 3 acetyl groups are combined with each glucose unit, and which is quite different in its solubility behaviour and above all in its textile and tinctorial properties from "acetate silk," has hitherto played no role as material for textile fibres, especially because no solvent has been known for the preparation of spinning solutions. This defect has however been obviated in more recent times and since triacetyl cellulose is far superior, for example in its stability to heat and steam, to the "2½ acetate" hitherto alone used, it has now acquired a greater importance and this has presented the dyer with fresh problems. The dyeability of triacetyl cellulose fibres also varies considerably from that of the usual acetate fibres; for example most of the dispersion dyestuffs used for dyeing acetate fibres show a reduced absorption capacity on fibres of triacetyl cellulose.

On the contrary, the dyestuffs of the new process, as compared with the corresponding non-esterified dyestuffs, i.e., those containing one or two terminal hydroxyl groups, are characterized not only by better absorptive capacity on the triacetyl cellulose fibres but also by better fastness to moisture and light.

The following examples will further illustrate this invention but the invention is not restricted to these examples. The parts specified in the examples are parts by weight.

*Example 1*

100 parts of a fabric of triacetyl cellulose are dyed for 60 minutes at 98° to 100° C. in a bath of 2 parts of the azo dyestuff obtained from diazotized 1-amino-2-methoxy-4-nitrobenzene by coupling with N-ethyl-N-(2-acetoxy)-ethyl-aminobenzene and 4 parts of Marseilles soap in 4000 parts of water. A deep red dyeing of very good fastness to light and good fastness to moisture is obtained.

By using, instead of the above mentioned dyestuff, 2 parts of the azo dyestuff 1-amino-2-methoxy-4-nitrobenzene→-N-ethyl-N-(2 - hydroxy)-ethyl-aminobenzene, considerably weaker and less fast dyeings are obtained.

Similar dyeings are obtained on structures of triacetyl cellulose with dyestuffs from the above diazo component by coupling with N-propyl-N-(4-acetoxy)-butyl-aminobenzene or N-butyl-N-(6-acetoxy)-hexyl-aminobenzene.

*Example 2*

100 parts of a fabric of triacetyl cellulose are dyed for 90 minutes at 98° to 100° C. in a bath of 1.5 parts of the azo dyestuff from diazotized 1-amino-2-methoxy-4-nitrobenzene by coupling with the isobutyric acid ester of 1-[N-methyl-N-(2-hydroxy)-ethyl]-amino-3 - methylbenzene and 2 parts of Marseilles soap in 4000 parts of water. A considerably more powerful dyeing and one which has better fastness to moisture and light is obtained than when the same amount of the dyestuff which has not been esterified with isobutyric acid is used.

*Example 3*

100 parts of flocks of triacetyl cellulose are dyed for 60 minutes at 98° to 100° C. in a bath of 1 part of the azo dyestuff derived from diazotized 1-amino-3-nitrobenzene and the isobutyric acid ester of N-ethyl-N-(2-hydroxy)-ethyl-aminobenzene and 3 parts of the reaction product derived from one mol of castor oil and 40 mols of ethylene oxide in 3000 parts of water.

Deep yellow dyeings are obtained which are stronger in color and of better fastness to light and moisture than when 1 part of the azo dyestuff 1-amino-3-nitrobenzene→N-ethyl-N-(2-hydroxy)-ethyl-aminobenzene is used.

*Example 4*

100 parts of a fabric of triacetyl cellulose are dyed for 90 minutes at 98° to 100° C. in a bath of 2 parts of the azo dyestuff obtained from diazotized 1-amino-2-chlor-4-nitrobenzene by coupling with N-ethyl-N-(2-acetoxy)-ethyl-aminobenzene and 3 parts of the reaction product of one mol of sperm oil alcohol and 25 mols of ethylene oxide in 5000 parts of water. Deep ruby red dyeings of good fastness properties are obtained.

By using, instead of the said dyestuff, the same amount of the azo dyestuff 1-amino-2-chlor-4-nitrobenzene→N- ethyl-N-(2-hydroxy)-ethyl-aminobenzene, weaker and less fast dyeings are obtained.

Similar dyeings are obtained on structures of triacetyl cellulose using dyestuffs from diazotized 1-amino-2-chlor-4-nitrobenzene by coupling with N-methyl-N-(2-acetoxy)-propyl-aminobenzene, N-butyl-N-(2-acetoxy)-ethyl-aminobenzene, 1-[N-methl-N-(2-acetoxy) - ethyl] - amino-3-methylbenzene or the isobutyric ester of N-ethyl-N-(2-hydorxy)-ethyl-aminobenzene.

*Example 5*

100 parts of threads of triacetyl cellulose are dyed for 2 hours at 90° to 95° C. in a bath of 1.5 parts of the azo dyestuff 1-amino-2.4-dinitrobenzene→N-butyl-N - (2-acetoxy)-ethyl-aminobenzene and 2 parts of Marseilles soap in 2000 parts of water.

Deep ruby red dyeings are obtained which are stronger in color and exhibit better fastness properties than dyeings produced with the same amount of the azo dyestuff 1-amino-2.4-dinitrobenzene→N-butyl - N - (2 - hydroxy)-ethyl-aminobenzene.

*Example 6*

If instead of the dyestuff specified in Example 5, there is used under otherwise identical conditions the same amount of the azo dyestuff from diazotized 1-amino-4-nitrobenzene by coupling with N-ethyl-N-(2-acetoxy)-ethyl-aminobenzene or the azo dyestuff from the same diazo component and N-methyl - N - (4-acetoxy) - butyl-aminobenzene, deep scarlet red dyeings are obtained which are of better fastness to light and moisture than corresponding dyeings produced with the same amount of the azo dyestuff 1-amino-4-nitrobenzene→N-ethyl - N - (2-hydroxy)-ethyl-aminobenzene.

*Example 7*

100 parts of fabric of triacetyl cellulose are dyed for 60 minutes at 98° to 100° C. in a bath of 2 parts of the azo dyestuff 1-amino-2-methoxy-4-nitrobenzene→1-[N.N-bis-(2-acetoxy)-ethyl]-amino-3-methylbenzene and 4 parts of Marseilles soap in 4000 parts of water.

A deep red dyeing is obtained which has better fastness to light, washing, perspiration and water than a dyeing produced in the same way with 2-parts of the corresponding non-esterified dyestuff.

In the same way, fibres, fabrics and other structures of triacetyl cellulose can be dyed with azo dyestuffs obtained from the following components:

| Diazo component | Coupling component | Shade |
| --- | --- | --- |
| 1- amino- 2- ethylsulfonyl- 4-nitrobenzene. | The acrylic ester of N-ethyl-N- (2- hydroxy)- ethyl-aminobenzene. | ruby red. |
| 1-amino- 2- methylsulfonyl- 4-nitrobenzene. | N- ethyl- N- (2- acetoxy)-ethyl-aminobenzene. | Do. |
| 1- amino- 4- nitrobenzene- 2-[N- (2'- hydroxy)- ethyl]-sulfonamide. | The isobutyric ester of N-ethyl- N- (2- hydroxy)-ethyl-aminobenzene. | Do. |

What we claim is:
1. Structures of triacetyl cellulose colored with the monoazo dyestuff obtained from diazotized 1-amino-2-methoxy-4-nitrobenzene by coupling with N-ethyl-N-(2-acetoxy)-ethyl-aminobenzene.
2. Structures of triacetyl cellulose colored with the monoazo dyestuff obtained from diazotized 1-amino-4-nitro-benzene by coupling with N-ethyl-N-(2-acetoxy)-ethyl-amino-benzene.
3. Structures of triacetyl cellulose colored with the monoazo dyestuff obtained from diazotized 1-amino-2-chlor-4-nitrobenzene by coupling with N-ethyl-N-(2-acetoxy)-ethyl-aminobenzene.
4. Structures of triacetyl cellulose colored with the monoazo dyestuff obtained from diazotized 1-amino-2-methyl-sulfonyl-4-nitrobenzene by coupling with N-ethyl-N-(2-acetoxy)-ethyl-aminobenzene.

References Cited in the file of this patent
UNITED STATES PATENTS

| | | |
| --- | --- | --- |
| 2,045,324 | Felix | June 23, 1936 |
| 2,196,776 | McNally | Apr. 9, 1940 |
| 2,241,247 | Dickey | May 6, 1941 |

OTHER REFERENCES

Seidenfaden, Melliand Textilberichte, vol. 32, December 1951, pages 951–952.

Boulton: J. Soc. of Dyers and Colourists, vol. 71, No. 8, August 1955, page 454.